United States Patent [19]

Hogan et al.

[11] Patent Number: 5,657,246

[45] Date of Patent: Aug. 12, 1997

[54] METHOD AND APPARATUS FOR A VIDEO CONFERENCE USER INTERFACE

[75] Inventors: Michael J. Hogan; Reed Howard Rinn, both of Austin, Tex.

[73] Assignee: Vtel Corporation, Austin, Tex.

[21] Appl. No.: 399,610

[22] Filed: Mar. 7, 1995

[51] Int. Cl.$^6$ .................................................. H04B 1/56
[52] U.S. Cl. ..................... 348/515; 348/13; 348/14
[58] Field of Search ..................... 364/514 A; 348/13, 348/14, 15, 211, 347; 379/96, 158; 395/155, 159

[56] References Cited

U.S. PATENT DOCUMENTS 5,375,068  12/1994  Palmer et al. ..................... 364/514
5,528,289   6/1996  Cortjens et al. .................... 348/211

Primary Examiner—Emanuel T. Voeltz
Assistant Examiner—Thomas Peeso
Attorney, Agent, or Firm—Baker & Botts, L.L.P.

[57] ABSTRACT

A video conference platform includes a graphical user interface for configuration and control of a video conference. In particular, the graphical user interface allows for "windows" type operations to control various aspects of the video conference, including initial configuration, camera control, and data transmission.

26 Claims, 5 Drawing Sheets

METHOD AND APPARATUS FOR A VIDEO CONFERENCE USER INTERFACE

TECHNICAL FIELD OF THE INVENTION

This invention relates generally to video conferencing systems, and more particularly to a method and apparatus for a video conference user interface.

BACKGROUND OF THE INVENTION

Technical advances in recent years have made video conferencing a cost effective and increasingly wide spread alternative to physical face-to-face meetings. In a typical video conference, the participants transmit and receive audio and video signals that allow all participants to hear one another, and allow each participant to see at least one of the other participants.

To efficiently transmit the large amount of video and audio information generated at a particular video conferencing site, video conferencing systems typically digitize and compress the video and audio data for transmission across digital networks. Various compression schemes are available, and various digital networks are available as well. These digital networks include the switched 56 Kbit/second digital networks offered by commercial telecommunications carriers, higher rate networks (for example those that support rates such as 384 Kbits/second), as well as other digital networks.

Because different rates, compression schemes, networks, and communications protocols (among other things) can be used, the video conferencing equipment used by each participant in a video conference must be properly configured to successfully communicate with other participants.

Once a video conference has begun, it is often desirable to adjust various components of the video conference. For example, a participant may wish to adjust the camera at a remote site, for example by panning or zooming it. As another alternative, a participant may want to mute his local camera or microphone so as to prevent others from seeing or hearing him. Or, a participant in a video conference may wish to direct a data file (or other data) to another participant, or broadcast the data file to all participants in the video conference. Each of these examples, and others, requires commands on the part of the user.

In prior art video conferencing systems, the initial configuration and subsequent control of a video conference have been performed through the use of complicated user interfaces. In particular, these user interfaces often require a fairly high technical understanding of the equipment involved, and thus are difficult to use. Furthermore, prior art user interfaces are not integrated with the video, and either obstruct the video conference or cause the user to be distracted from the video conference. Therefore, a need has arisen for a method and apparatus for a video conferencing user interface that allows for efficient and easy configuration and control of a video conference.

SUMMARY OF THE INVENTION

In accordance with the teachings of the present invention, a method and an apparatus for a video conference user interface are provided which substantially eliminate or reduce disadvantages and problems associated with prior art video conference user interfaces.

In particular, a video conference platform for transmitting and receiving audio and video signals to and from other video conference platforms is provided which includes a display for displaying video generated at a selected one of a remote camera and a local camera. Each camera includes movement circuitry operable to pan, tilt, and zoom the camera. An input device is also provided, such as a computer mouse, light pen, keyboard, electronic pen, or other input device. The input device generates input signals used in part to position a cursor on the display or to initiate actions. A processor is coupled to the display and to the input device, and receives the input signals to control panning, tilting, and zooming of video from the selected camera based on the cursor's position.

In a particular embodiment, the video is displayed in a window on the display. In another embodiment, an object icon may also be displayed on the display, and the processor is operable to transmit to another video conference platform data represented by the object icon upon movement of the object icon to the window with the input device. Furthermore, in a particular embodiment, the display includes a zoom area and a pan/tilt area. The processor is operable to cause video from the selected camera to zoom when the cursor is in the zoom area and to cause panning and tilting when the cursor is in the pan/tilt area.

In another embodiment, a tool bar is displayed with various icons for use in configuring and controlling video conferences.

A method of controlling the video conference is also provided which includes displaying video generated at a selected one of a remote camera and a local camera on a display. The method also includes positioning a cursor on the display, and panning, tilting, and zooming video from the selected camera based on the cursor's position.

An important technical advantage of the present invention is that a graphical user interface is provided for controlling a video conference. This graphical user interface greatly increases the efficiency by which video conferences can be controlled, since it is integrated with the video and thus allows control of a video conference without obstructing the conference or requiring distractions from the conference.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
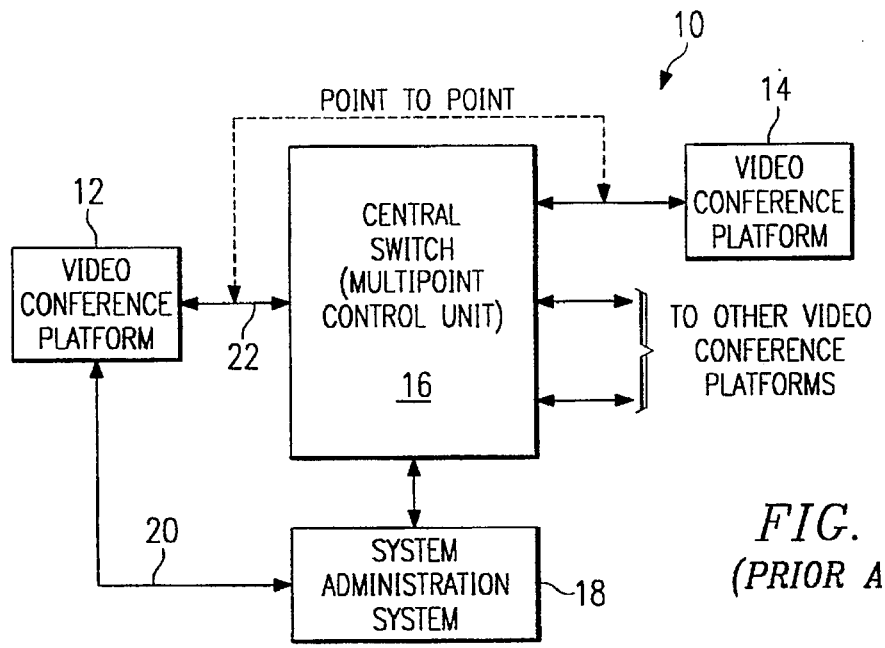
FIG. 1 illustrates a block diagram of a video conferencing system.

AS shown in FIG. 1, a typical video conferencing system 10 includes a video conference platform 12 coupled to another video conference platform 14. Each video conference platform includes a camera for generating video information, a microphone for generating audio information, a display for displaying video information, a speaker for broadcasting audio information, and control and communication circuitry for controlling the platform and handling communications with other platforms. Each platform may have more than one camera, microphone, display, and speaker.

The video conference platforms 12 and 14 may be coupled directly (as shown by the dotted line in FIG. 10) in a point-to-point call, or coupled through a central switch 16, often referred to as a multipoint control unit. As shown in FIG. 1, other video conference platforms can also be part of the system, for example in a multipoint call, and will generally be joined to the video conference through the central switch 16. Each video conference platform includes circuitry for transmitting and receiving compressed digital video and audio data, as well as other kinds of data, and thus the platforms communicate over digital networks. The user interface of the present invention could also be used, however, with systems that transmit and receive analog audio and/or video signals.

A system administration system 18 (such as a personal computer type system) may be coupled to central switch 16 to allow for configuration and control of the central switch 16 and therefore of video conferences switched through the central switch 16. The system administration system 18 may also be coupled directly to the various video conference platforms, such as video conference platform 12, for direct communication and control. Furthermore, this direct communication allows for the functions of system administration system 18 to be performed remotely at the video conference platform 12. The link 20 shown between video conference platform 12 and system administration system 18 may be a separate link, such as one made over the telephone system, or the link may be part of the link 22 shown between video conference platform 12 and central switch 16. It should be understood, however, that all the functions of system administration system 18 may reside at a video conference platform, and no system 18 locally coupled to the central system switch 16 is needed.

Figure 2A:
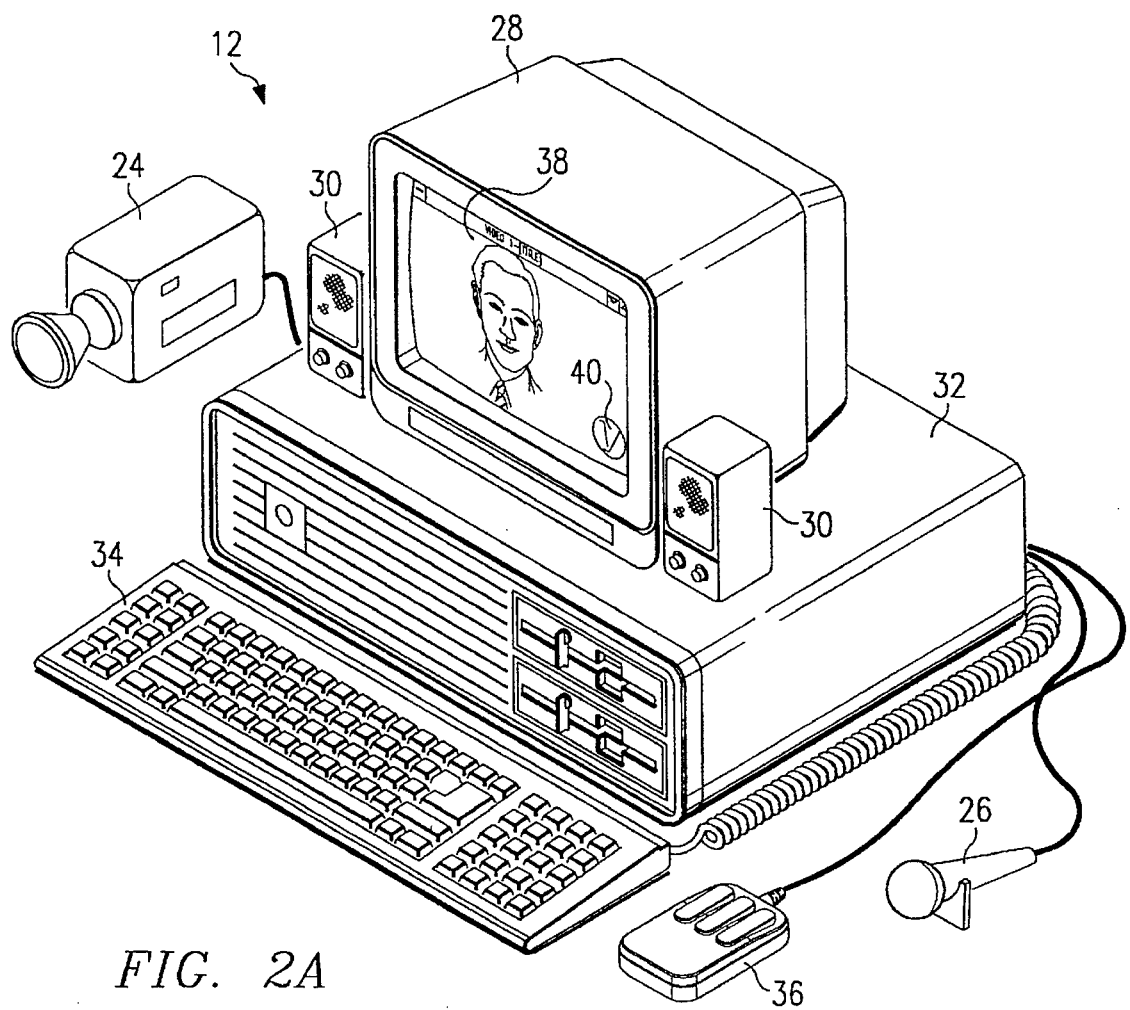
FIG. 2A illustrates a video conference platform with a user interface according to the teachings of the present invention.

As shown in FIG. 2A, a typical video conference platform 12 includes a camera 24 for generating video images. Preferably, camera 24 is a camera that allows for automatic pan, tilt, and zoom. Also included as part of the platform 12 is a microphone 26 for generating audio information, a display 28 for displaying video information, and a speaker 30 for broadcasting audio information. General control of the platform 12, and communications with other video conference platforms, is performed by control and communications circuitry 32. Control and communications circuitry 32 may be, for example, a personal computer type system, although other processor based systems may also be used. A user of the platform 12 generates inputs to the platform 12 through an input device such as a keyboard 34, a mouse 36 (a track-ball type device), and, with voice recognition, through microphone 26. It should be understood that other input devices, such as light pens, electronic pens and pen pads, touch screen displays and other devices, may also be used.

The following description provides specific examples where the input device is a computer mouse controlling a cursor displayed on the display. However, it should be understood that the present invention contemplates the use of other input devices. With a voice recognition system, for example, rather than controlling a cursor on the display, voice commands will be used to implement the functions discussed below.

Figure 2B:
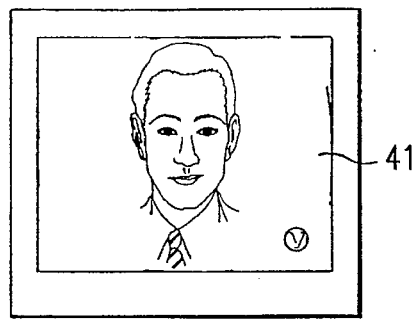
FIG. 2B illustrates a video conference display according to the teachings of the present invention.

The user interface of the present invention can be implemented on various video conference platforms presently available, such as the MediaMax and SMax video conference platforms manufactured by the VTEL Corporation, as well as other video conference platforms manufactured by others. As shown in FIGS. 2A and 2B, the display of the user interface may be on a monitor, such as those used with computers, or large screens, although other displays may also be used. FIG. 2A shows a "desktop" type display, while FIG. 2B shows another (typically larger) display 41 for viewing in a room, such as a conference room.

As shown in FIG. 2A, the display 28 includes a video conference window 38 for displaying video from a selected video source, such as a remote camera, a local camera, a local auxiliary video source, or any other video source. This video conference window 38 can be opened, closed, minimized, or maximized just as any other window in a windows-type operating environment. Other windows may also be open at the same time—such as document windows, video windows from other cameras (local or remote), or other windows. "Windows" refers to the operating environment created by the Windows software of the Microsoft Corporation, or any other "windows" type system, such as those available with IBM Corporation's OS/2 system or Apple Corporation's Macintosh system.

As shown in the window 38, a non-obtrusive, gateway icon 40 is also provided. The particular icon shown, which is exemplary only, is the trademark logo of the VTEL Corporation. This gateway icon 40 provides a gateway to a part of the user interface to be discussed below.

As shown in FIG. 2B a larger "full screen" image 41 can be displayed if the windows artifacts (such as the open/close, minimize, and maximize buttons) are not displayed. The present invention contemplates both a windows-type display and a non-windows type display. As shown in FIG. 2B, the gateway icon 40 is also displayed on the larger image 41. The gateway icon 40 is preferably a non-obtrusive, translucent icon, and is displayed until it is used to present a tool bar, as will be discussed. However, it can be made to disappear after some event, such as a time-out.

Another part of the user interface involves using the mouse and cursor to control the pan, tilt, and zoom of the camera that generates the video displayed in the window 38 (which can be any camera, such as the local or remote camera). The pan, tilt, and zoom actions result from either controlling the camera's movement circuitry to physically move the camera, or by controlling which pixels generated by the camera are actually displayed. In the latter case, for example, a camera generates an array of pixels, and less than all of the array is displayed. By selecting different portions of the array for display, pan, tilt, and zoom is effectively accomplished. The pan, tilt, and zoom actions are discussed in connection with FIGS. 3A, 3B, and 4.

Figure 3A:
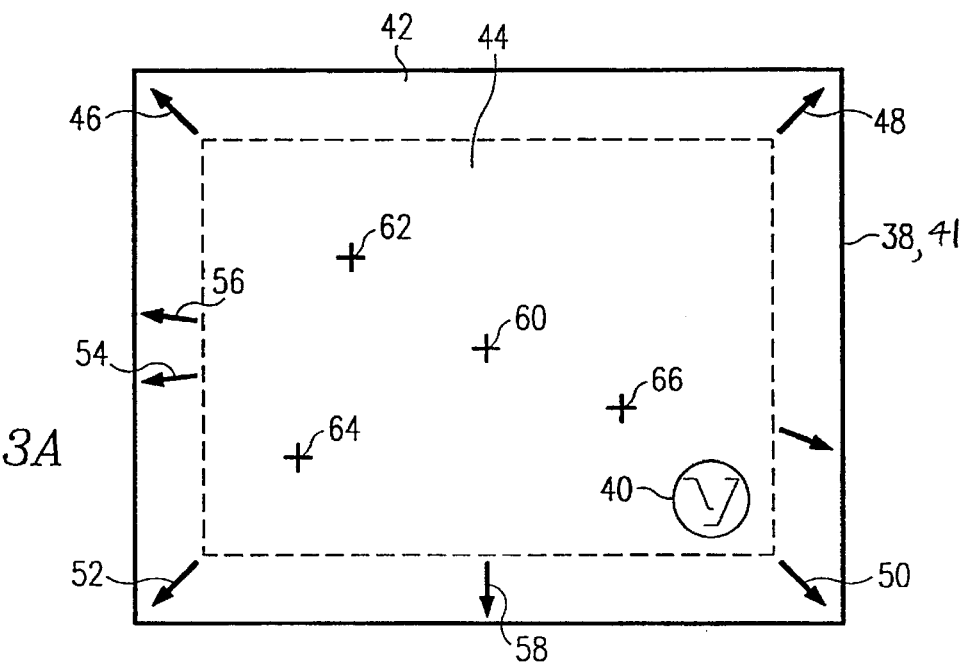
FIG. 3A illustrates various cursor positions on a video conferencing image according to the teachings of the present invention.

FIG. 3A illustrates the video window 38 (or display 41), icon 40, and various cursor locations. Two regions 42 and 44 are shown within window 38. Region 42 represents a pan/tilt region around the border of the window 38 wherein the cursor will appear as an arrow pointing in a direction that depends on the particular location of the cursor. When the cursor is in this region 42, and the primary mouse button is pressed, the camera that is generating the image shown in the window 38 will be panned and tilted in the direction of the arrow, until the mouse button is released. Thus, with the cursor in the position shown by cursor 46, the camera generating the video shown in window 38 will be panned left and upward. Similarly, with the cursor in the position shown by reference 48, the camera will be panned and tilted right and upward. Cursor position 50 corresponds to panning and tilting right and downward, with cursor position 52 corresponding to a left and downward panning and tilting. Cursor position 54 corresponds to a pan to the left with no tilting, while cursor position 56 represents panning to the left with a slight upward tilt. Thus, for example, the camera generating the video for window 38 will be tilted straight down when the cursor is placed at position 58, and will be panned straight left when the cursor is placed at position 54. Moving the cursor between locations 54 and 58 (within area 42) results in varying degrees of panning and tilting between those of position 54 and 58.

When the cursor is in zoom region 44, it will appear as a cross-hair, as shown by the various cross-hair positions shown in FIG. 3A. With the cursor in zoom region 44, centering and zooming can be accomplished by placing the cursor at the particular location desired to be the center of the video image, and then pressing the primary mouse button. For example, with the cursor at position 60, the video image will be centered when the primary mouse button is first pressed, and then zoomed in until the primary mouse button is released. The image will be zoomed out when the secondary mouse button is pressed. If it is desired to move to another position for zooming, for example position 62, the cursor is simply moved to that position and then either the primary or secondary mouse button is pressed to allow for zooming in or zooming out. Similarly, the cursor can be moved to position 64 and 66 to perform the same actions. Moving to a particular location and simply "clicking" the primary mouse button (or, if desired, the secondary button) results in centering without zooming.

Figure 3B:
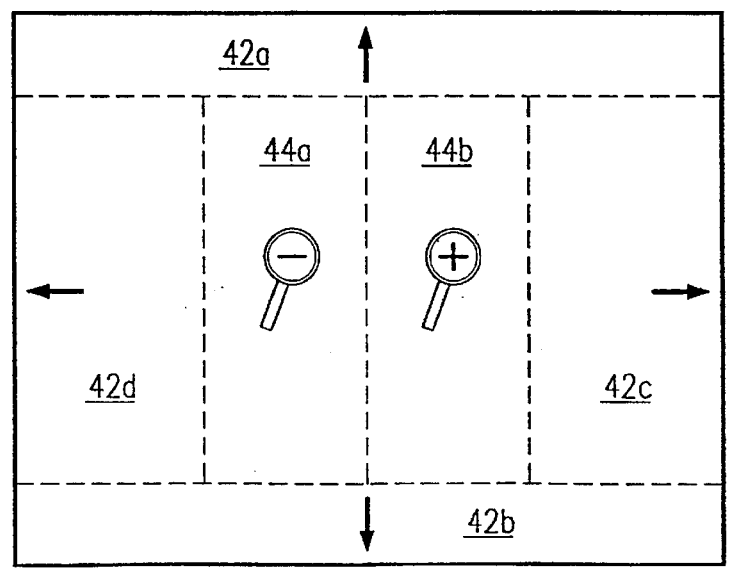
FIG. 3B illustrates another embodiment of cursor positions according to the teachings of the present invention.

FIG. 3B illustrates an alternative setup, in which the display is divided into several regions. With the cursor in region 42a, the camera is tilted up; in 42b, the camera is tilted down; in 42c, the camera is panned right; and in 42d, the camera is panned left. With the cursor in region 44a, the camera is zoomed out (no centering), and in region 44b the camera is zoomed in.

Figure 4:
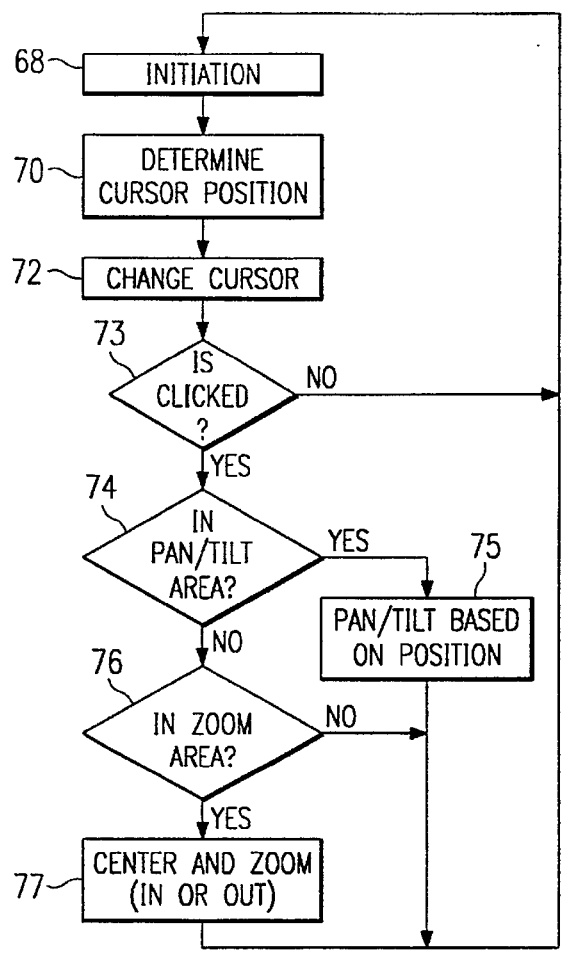
FIG. 4 illustrates a method of controlling a camera according to the teachings of the present invention.

FIG. 4 illustrates a flow diagram of the method by which the present invention controls the camera that generates the video shown in window 38 (or display 41). The routine is initiated at step 68. The video conference platform, after initiation at step 68, will determine the cursor position at block 70. Depending on the cursor position, at block 72 the cursor's shape is changed to reflect the corresponding function, such as an arrow for panning and tilting, a cross-hair, or perhaps a magnifying glass for zooming, among other possible cursor shapes. At decision block 73 it is determined whether the mouse has been clicked. If no mouse button is pressed then the method branches to step 68. If a mouse button has been pressed, then block 74 is encountered.

If the cursor position is in the pan/tilt area 42, then at step 74 the method will branch to step 75 wherein the appropriate pan and tilt is performed based on the position of the cursor. After the panning and tilting is completed (release of the mouse button), the method loops back to step 68. If at step 74 the cursor is not in the pan/tilt area 42, then at step 76 it is determined whether the cursor is in the zoom area 44. If the cursor is not in the zoom area 44, then the method branches back to step 68. If at step 76, however, it is determined that the cursor is in the zoom area 44, then the zooming action discussed above is performed at step 77. After the zooming (and, if included, centering) has been completed, the method branches back to step 68.

Figure 5A:
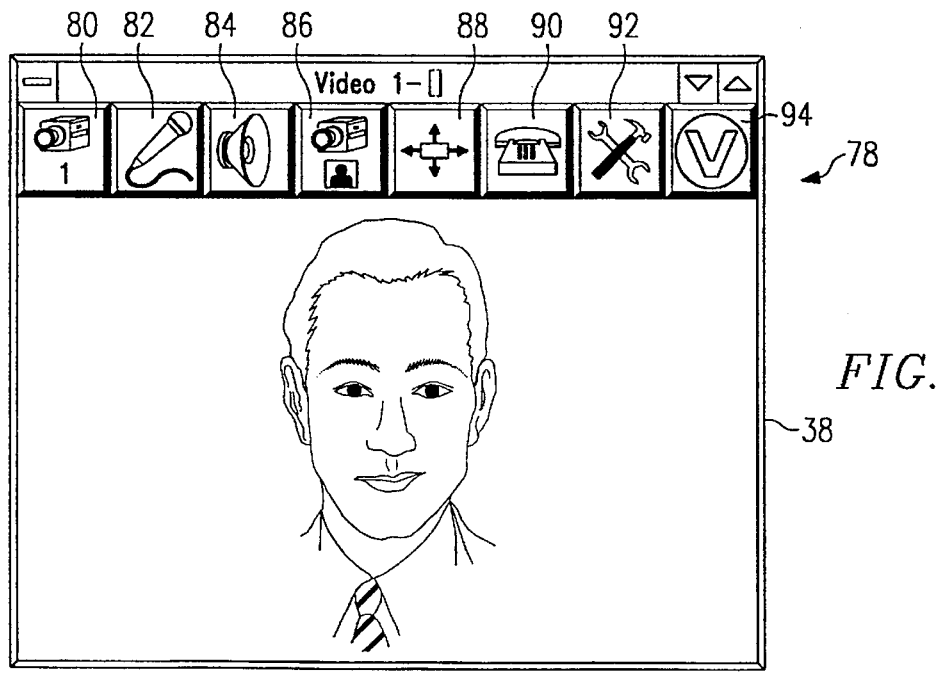
FIG. 5A illustrates a video conferencing image with a tool bar according to the teachings of the present invention.

FIG. 5A illustrates video window 38 and a tool bar 78. Tool bar 78 may be displayed at all times (unless closed), for example with the desktop embodiment. Alternatively, it can be displayed only after the cursor is passed over the gateway icon 40, such as with the room view setup. However, either alternative can be used with both the desktop or room view choices. Furthermore, the tool bar can be made to disappear if the cursor is not moved for a given amount of time.

Figure 5B:
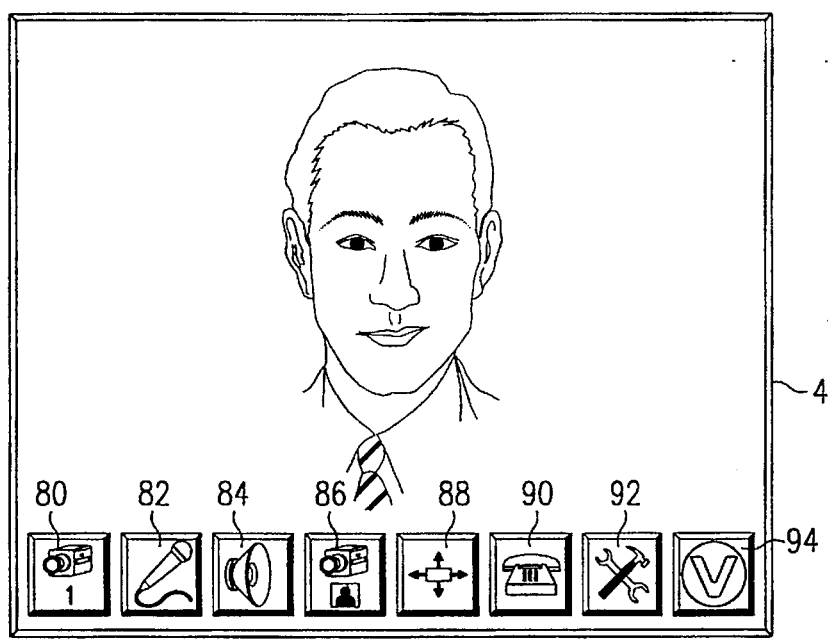
FIG. 5B illustrates another video conferencing image with a tool bar according to the teachings of the present invention.

The tool bar 78 shown in FIG. 5A is exemplary, and other icons and tool bars may be used without departing from the intended scope of the present invention. For example, as shown in FIG. 5B, the tool bar may be presented without window-type artifacts, such as when a non-desktop type setup is desired (e.g., display 41). As shown in FIG. 5B, the icons appear as separate unconnected icons, for example. The tool bar 78 allows for efficient and easy control of a video conference, as will be discussed below.

Shown within exemplary tool bar 78 is camera icon 80. Clicking the primary mouse button while the mouse cursor is on camera icon 80 results in toggling of the camera mute on and off. Similarly, the microphone and speaker of the video conferencing platform may be turned on and off by pressing the primary button when the mouse cursor is on microphone icon 82 or speaker icon 84, respectively. Local/Remote icon 86 is used to determine whether a video image generated at a remote video conference platform or a video image generated at the local video conference platform will be displayed in video window 38. During a multipoint call, the remote source is determined by the particular type of call that has been made. For example, in a "video-follows-voice" call, the remote source will be the participant who is talking (or the last to talk). During a chairperson-controlled call, the remote source will be that designated by the chairperson. At the chairperson's platform, the chairperson can choose the remote source. Alternatively, every platform can be given the ability to choose the video they see.

Pressing the primary mouse button while the mouse cursor is over zoom icon 88 results in zooming of the camera generating the video displayed in video window 38.

Pressing the primary mouse button when the mouse cursor is over configuration icon 90 results in several functions, depending on the status of a call. If a video conference call has not been established, then a window will be displayed which allows for initiation of a call with various stored numbers according to stored call configurations. If an incoming call is indicated, then pressing the primary mouse button on icon 90 results in call connection. Once a call has been established, pressing the primary button results in display of a dialogue that allows hang-up. Pressing the secondary mouse button on icon 90 accesses a directory management program which allows for storing and modifying of various telephone numbers associated with other video conference terminals, as well as the establishment of configuration parameters, such as bit rates, compression algorithms, communications protocols, network interfaces, and others that will be used in connection with calls to particular video conference platforms.

Pressing the primary mouse button while the mouse cursor is over tool icon 92 results in the display of a configuration tools tab-index dialog box. This dialog box allows user to customize their own tool bars by adding or deleting various icons for display. The dialog box includes a library of all possible icons that can be added to the tool bar.

Pressing the primary mouse button when the mouse cursor is over icon 94 results in hiding of the displayed tool bar and a reversion to the non-obtrusive icon 40.

When the mouse cursor is passed over any one of the exemplary icons shown in FIG. 5, a text window describing the function of the icon will appear. For example, when the mouse cursor passes over icon 86, a text window will appear with the text "View LocalRemote."

Figure 6:
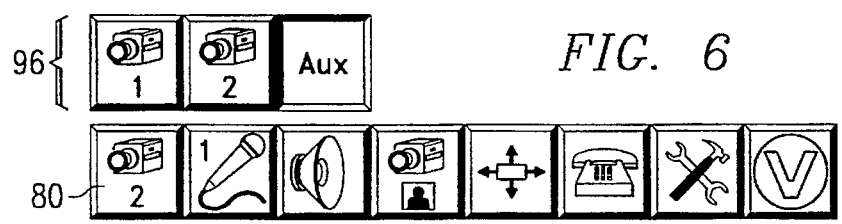
FIG. 6 illustrates an exemplary tool bar according to the teachings of the present invention.

FIG. 6 illustrates display of a secondary tool bar 96. The particular tool bar 96 shown is exemplary only and is associated with the camera icon 80. When the secondary mouse button is pressed and the mouse cursor is over icon 80, the secondary tool bar appears, and provides the user with a choice of which video source will generate video at his platform. For example, with the secondary tool bar 96 of FIG. 6, three video sources are available at the particular video conference platform: camera 1, camera 2, and an auxiliary source (such as a video cassette recorder). The video source selected from secondary tool bar 96 will appear on the primary tool bar at icon 80. Similar functions are provided for the other icons of the tool bar 78 as well.

Figure 7A:
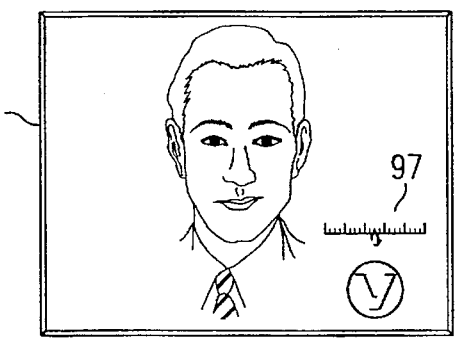
FIGS. 7A and 7B illustrate exemplary audio volume tools according to the teachings of the present invention.

FIG. 7A illustrates display 38 or 41 with gateway icon 40 and volume gauge 97. Volume gauge 97 appears when the cursor is moved, and clicking on the pointer of the gauge allows the pointer to move up and down along the gauge, with corresponding volume control. The gauge 97 can be made to disappear after some event, such as a time-out after no cursor movement.

Figure 7B:
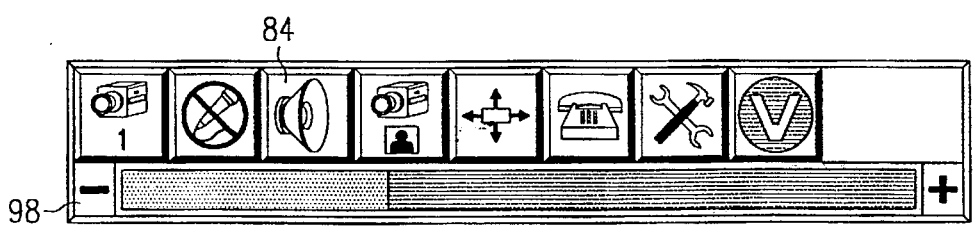

FIG. 7B illustrates an alternative audio volume interface, in which an audio monitor volume slider 98 is used. When the secondary mouse button is pressed while the cursor is over the audio icon 84, the slider 98 appears. This slider allows the user to adjust the volume of the speaker by "clicking" the mouse cursor on the slider and moving it right or left. Alternatively, the gauge 97 can appear in connection with audio icon 84.

Camera and audio control are the two most frequently used controls during video conferences. Thus, the camera control discussed in FIGS. 3A, 3B, and 4 may be always available, as well as the volume control, such as with volume gauge 97. Gauge 97, as discussed above, can be made to appear, non-obtrusively, whenever the cursor is moved.

Figure 8:
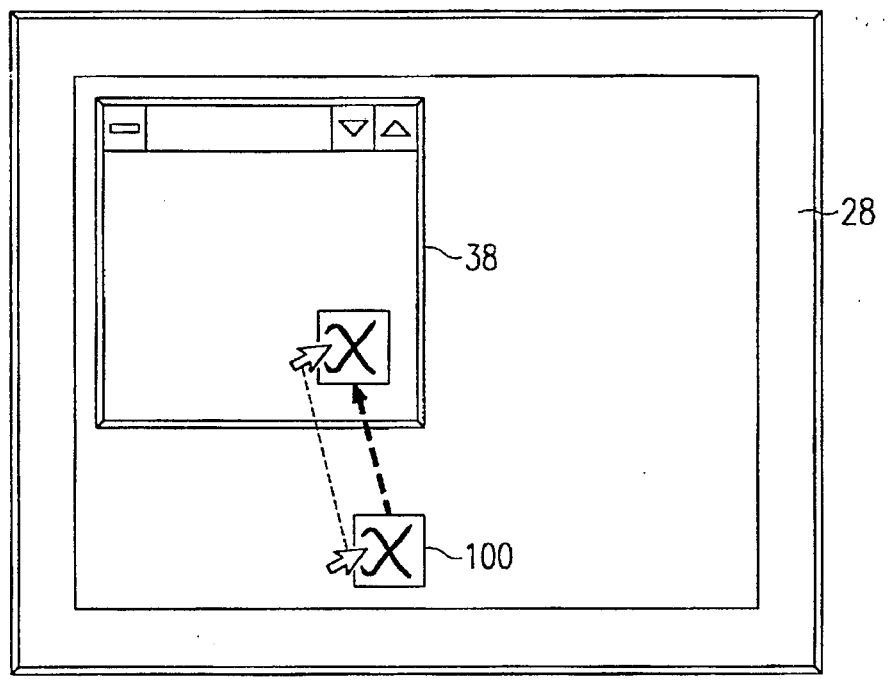
FIG. 8 illustrates a method of initiating transfer of data during a video conference according to the teachings of the present invention.

FIG. 8 illustrates a technique by which data can be transferred from one video conference platform to another using the user interface of the present invention. As shown in FIG. 8, window 38 is provided on monitor 28. An icon 100 (icon x) is also shown in the display 28. This icon 100 represents any computer object or part of a computer object, such as any computer file or computer window. For example, such objects may include word processing files, spread sheet files, or any other computer object (including peripheral devices coupled to the platform). By using a "drag and drop" operation of clicking the mouse cursor on the icon and holding down while sliding the cursor, the object represented by the icon 100 can be "dropped" to window 38. This operation results in the particular object represented by the icon 100 being transmitted to the video conference platform at which the video shown in window 38 is generated. For a peripheral device represented by icon x, data readings (such as temperature or pulse) are transmitted with the "drag and drop" operation. For other types of peripherals, such as fax machines, a data channel is opened between the peripheral device and the remote platform. Alternatively, the operation can be configured to result in the broadcast of the object represented by the icon 100 to all participants of the video conference.

Figure 9:
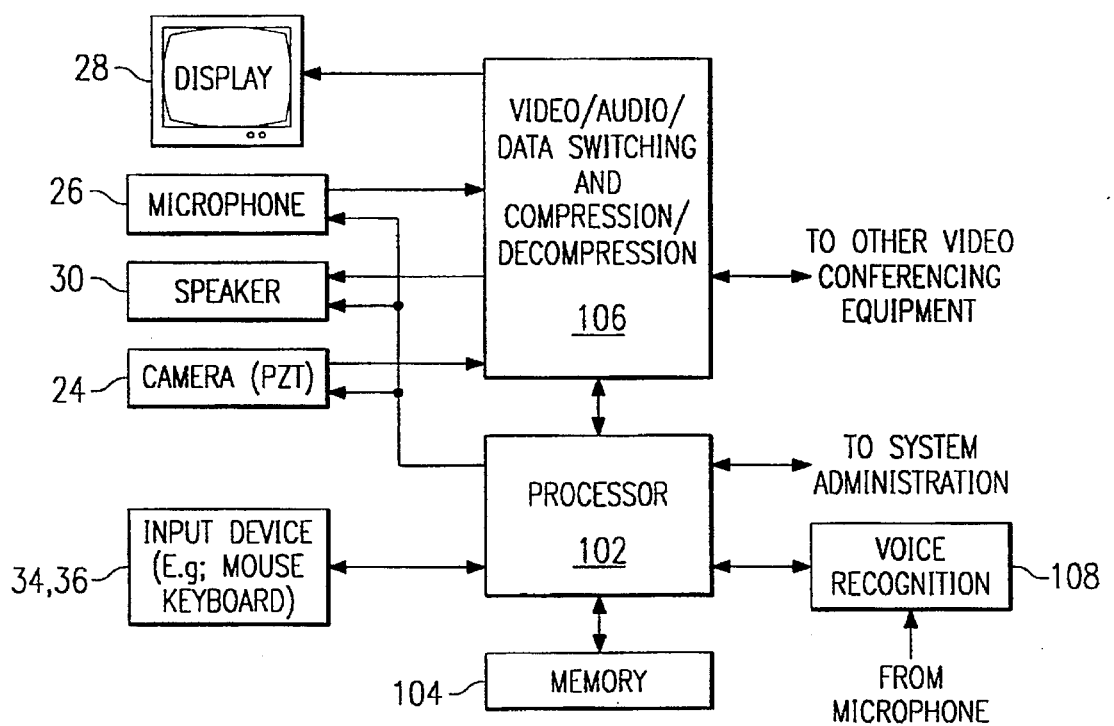
FIG. 9 illustrates a block diagram of a video conference platform according to the teachings of the present invention.

FIG. 9 illustrates a block diagram of a video conferencing platform according to the teachings of the present invention. As shown in FIG. 9, a processor 102 is coupled to a memory 104. Processor 102 executes various instructions and performs control of switching and communications as will be described. Processor 102 is also coupled to video/audio/data switching and compression/decompression circuitry 106. Processor 102 is also coupled to voice recognition circuit 108. As discussed above, input devices such as keyboard 34 and mouse 36 are used by the user to input signals to the system. These devices are also coupled to processor 102.

The video output of camera 24 is coupled to circuit 106 for switching (for example back to display 28) and compression. Similarly, the output of microphone 26 is coupled to circuit 106 for switching and compression. Circuit 106 also directs audio to speaker 30. The panning, zooming, and tilting of camera 24 is under control of processor 102 (as well as its muting), as is the volume of speaker 30. Similarly, the gain of microphone 26 is controlled by processor 102.

The user interface described above is implemented in the hardware shown in FIG. 9 through software running on processor 102. In particular, processor 102 senses the user input, either through input devices 34 and 36 or voice recognition system 108, and responds by controlling the camera 24, microphone 26, speaker 30, or circuitry 106. Processor 102 also responds by transmitting data to circuitry 106 for transmission to the remote platforms for control of and communication with the remote platforms (such as camera control commands). Processor 102 also receives commands from remote platforms, through circuitry 106, for example, to adjust camera 24 (or microphone 26) as requested by the remote platforms.

For transmission of data as discussed in connection with FIG. 8, processor 102 will control circuit 106 to appropriately package the computer object represented by the object icon 100 for transmission to the other video conference platforms involved in the conference. Likewise, processor 102 receives data transmitted from other platforms, and stores and displays such data, as needed.

As discussed above, the basic hardware shown in FIG. 9 is commercially available in video conference platforms now on the market, such as the MediaMax and SMax video conference platforms manufactured by VTEL Corporation, as well as other video conference platforms manufactured by others.

An important technical advantage of the present invention is the fact that the graphical user interface is provided for performing operations to allow control of a video conference. By using familiar windows operations to control a video conference, the ease of controlling a video conference is greatly increased.

The user interface of the present invention may also be implemented with voice processing. With voice processing, a "meta-command" word or phrase is first input. After recognition of the "meta-command," other voice commands, such as "pan-left," "pan-right," "tilt-up," "tilt-down," "zoom-in," "zoom-out," "volume-up," "volume-down," and others can be input to accomplish the desired function. Although the present invention has been described in detail, it should be understood that various changes, substitutions, and alterations can be made without departing from the intended scope of the present invention.

What is claimed is:

1. A video conference platform for transmitting and receiving audio and video signals to and from other video conference platforms, comprising:

a display for displaying video generated at a selected one of a remote camera and a local camera;

an input device operable to generate input signals, said input signals used in part to position a cursor on said display; and a processor coupled to said display and said input device, said processor operable to receive said input signals and to effect pan, tilt, and zoom of video from the selected camera based on said cursor's position;

wherein said video is displayed in a window on said display.

2. The video conference platform of claim 1, and further comprising an object icon displayed on said display, said processor operable to transmit to another video conference platform data represented by said object icon upon movement of said object icon to said window with said input device.

3. The video conference platform of claim 1, wherein said display includes a zoom area and a pan/tilt area, said processor operable to cause the selected camera to zoom when said cursor is in said zoom area, and said processor operable to cause the selected camera to pan and tilt when said cursor is in said pan/tilt area.

4. The video conference platform of claim 1, wherein said input device is a computer mouse.

5. The video conference platform of claim 1, said processor further operable to display a tool bar on said display, said tool bar including a remote/local icon for use with said input device to select between said remote camera and local camera for said displayed video.

6. The video conference platform of claim 1, and further comprising a speaker for broadcasting audio, and wherein said processor is further operable to display a tool bar on said display, said tool bar including a speaker icon for use with said input device to control said speaker's volume.

7. The video conference platform of claim 1, and further comprising a plurality of microphones for detecting audio, and wherein said processor is further operable to display a tool bar on said display, said tool bar including a microphone icon for use with said input device to select among said microphones.

8. The video conference platform of claim 1, and further comprising an alternative source of local video, and wherein said processor is further operable to display a tool bar on said display, said tool bar including a video icon for use with said input device to select between said local camera and said alternative source of local video.

9. The video conference platform of claim 1, wherein said processor is further operable to display a tool bar on said display, said tool bar including a zoom icon for use with said input device to zoom the selected camera.

10. The video conference platform of claim 1, wherein said processor is further operable to cause the selected camera to pan and tilt to center video from the selected camera on said position of said cursor.

11. A method of controlling a video conference, comprising:

displaying video generated at a selected one of a remote camera and a local camera on a display;

positioning a cursor on the display;

panning, tilting, and zooming video from the selected camera based on the cursor's position; and displaying the video in a window on the display.

12. The method of claim 11, and further comprising:

displaying an object icon on the display;

moving the object icon to the window; and transmitting to a video conference platform data represented by the object icon.

13. The method of claim 11, wherein the display includes a zoom area and a pan/tilt area, and further comprising zooming the selected camera when the cursor is in the zoom area, and panning and tilting the selected camera when the cursor is in the pan/tilt area.

14. The method of claim 11, and further comprising displaying a volume gauge for use in controlling speaker volume.

15. The method of claim 11, wherein said panning, tilting, and zooming includes panning and tilting the selected camera to center video from the selected camera on said position of said cursor.

16. A method of controlling a video conference, comprising:

displaying video generated at a remote camera on a display;

displaying a tool bar on the display, the tool bar including a plurality of icons representing video conference functions; and positioning a cursor on a selected one of the icons and initiating the video conference function corresponding to the selected icon;

wherein the tool bar is displayed after positioning the cursor on a gateway icon.

17. The method of claim 16, and further comprising positioning the cursor on the displayed video and panning, tilting, and zooming the remote camera based on a position of the cursor.

18. The method of claim 17, wherein said panning, tilting, and zooming includes panning and tilting the remote camera to center video from the remote camera on said position of said cursor.

19. The method of claim 16, and further comprising:

displaying an object icon on the display;

moving the object icon onto the displayed video; and transmitting to a video conference platform data represented by the object icon.

20. The method of claim 16, wherein the tool bar includes a speaker icon for use in controlling a speaker's volume.

21. A method of controlling a video conference, comprising:

displaying video generated at a remote camera on a display;

displaying a tool bar on the display, the tool bar including a plurality of icons representing video conference functions; and positioning a cursor on a selected one of the icons and initiating the video conference function corresponding to the selected icon;

wherein the tool bar includes a microphone icon for use in selecting among a plurality of microphones.

22. A method of controlling a video conference, comprising:

displaying video generated at a remote camera on a display;

displaying a tool bar on the display, the tool bar including a plurality of icons representing video conference functions; and positioning a cursor on a selected one of the icons and initiating the video conference function corresponding to the selected icon;

wherein the tool bar includes a configuration icon for use in presenting configuration choices allowing for configuration of a video call.

23. The method of claim 22, and further comprising selecting from among the configuration choices a rate at which video conference data will be transferred between video conference participants.

24. A method of controlling a video conference, comprising:

displaying video generated at a remote camera on a display;

displaying a tool bar on the display, the tool bar including a plurality of icons representing video conference functions;

positioning a cursor on a selected one of the icons and initiating the video conference function corresponding to the selected icon; and changing the icons of the tool bar.

25. The method of claim 24, wherein changing comprises customizing the tool bar by a user.

26. The method of claim 25, wherein customizing can occur before, during, and after a video conference.

* * * * *